Feb. 2, 1926.
C. EDWARDS
CHAIN APPLYING DEVICE
Filed May 6, 1925
1,571,764
2 Sheets—Sheet 1
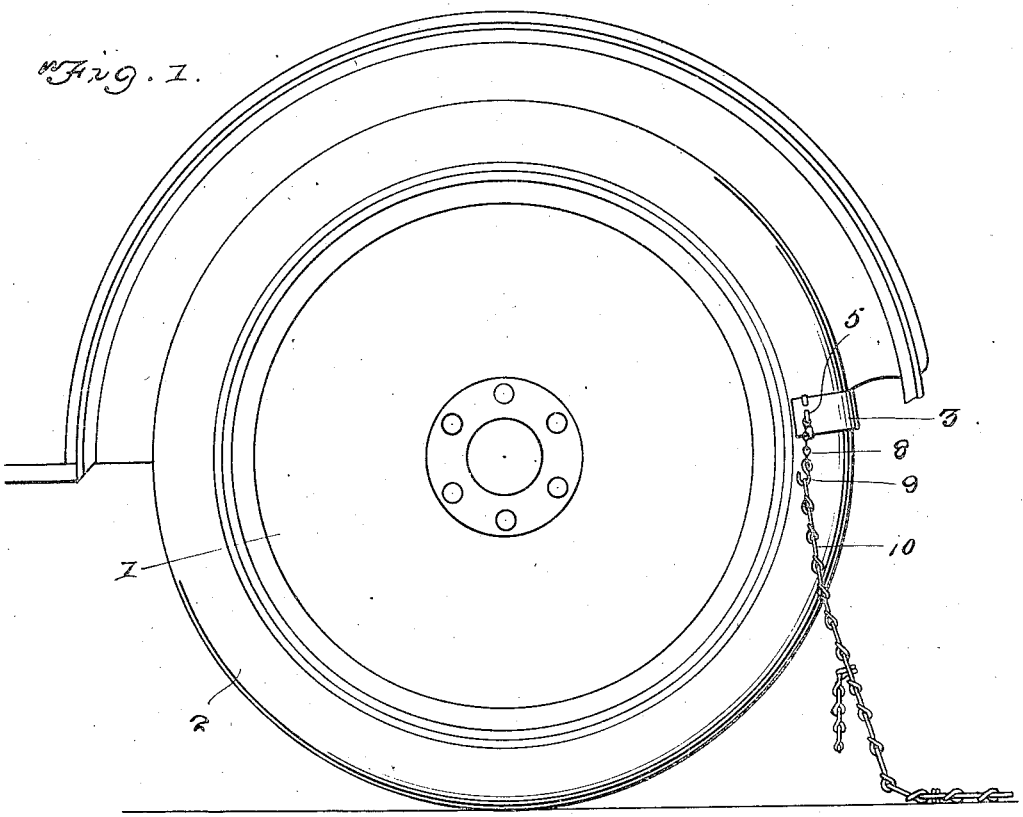
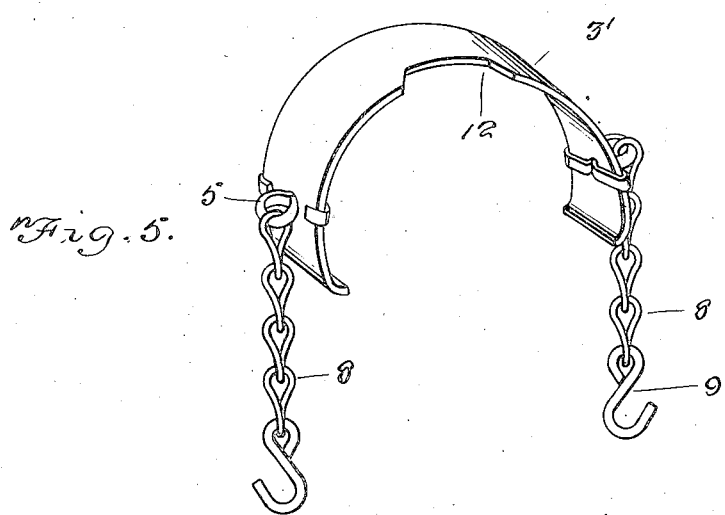
Charles Edwards
INVENTOR Feb. 2, 1926.
C. EDWARDS
CHAIN APPLYING DEVICE
Filed May 6, 1925
1,571,764
2 Sheets-Sheet 2
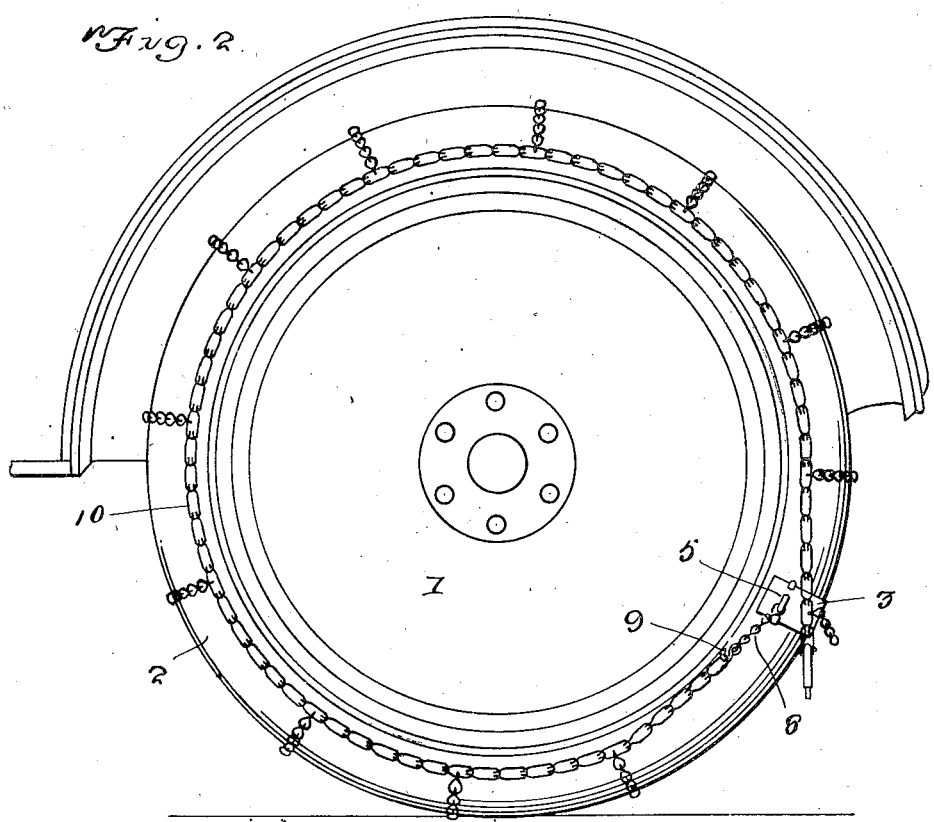
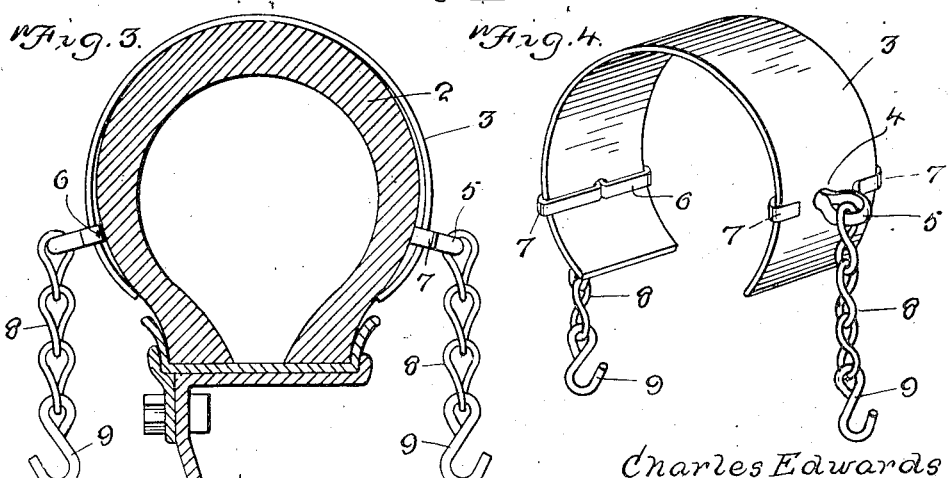
Charles Edwards
INVENTOR Patented Feb. 2, 1926.

1,571,764

UNITED STATES PATENT OFFICE.

CHARLES EDWARDS, OF LANSFORD, PENNSYLVANIA, ASSIGNOR OF ONE-FOURTH TO RICHARD HARVEY GRENFELL AND ONE-FOURTH TO JOHN F. GRENFELL, OF BEAVER MEADOWS, PENNSYLVANIA.

CHAIN-APPLYING DEVICE.

Application filed May 6, 1925. Serial No. 28,441.

*To all whom it may concern:*

Be it known that I, CHARLES EDWARDS, a citizen of the United States, residing at Lansford, in the county of Carbon and State of Pennsylvania, have invented new and useful Improvements in Chain-Applying Devices, of which the following is a specification.

The object of this invention is the provision of an extremely simple, inexpensive and easily applied detachable means for facilitating the arrangement of anti-skid chains around the tires of an automobile.

A further object is the provision of a means for this purpose, comprising spring clips designed to grip the tires on the drive wheels of an automobile, and carrying at their sides flexible elements, such as short chains having hooked ends to engage with the end links of the side members of anti-skid chains so that the vehicle may be driven ahead to wind the anti-skid chains around the tires, after which the clamps are removed and the meeting ends of the chains are connected together in the usual manner.

A further object is the provision of a means for this purpose which may be successfully employed upon either disc or spoked wheels.

A still further object is the provision of means for this purpose in which the short chain carrying elements of the clamps are of an extremely simple construction and function in causing the clamps to more effectively grip the tire.

To the attainment of the foregoing, reference is to be had to the drawings which accompany and which form part of this application.

In the drawings:—

Figure 1 is a side elevation of the rear portion of an automobile illustrating the application of my improvement thereon, the hooks on the clamp engaging the side members of the anti-skid chains prior to the application of the chain on the tire.

Figure 2 is a similar view showing the chain wound around the tire, the clamp in a position to be removed from the tire to permit of the ends of the side members of the anti-skid chain being attached.

Figure 3 is a transverse sectional view through a tire provided with the improvement.

Figure 4 is a perspective view of the improvement.

Figure 5 is a similar view but illustrating a slight modification.

In order that anti-skid chains may be simultaneously applied to both of the drive wheels of an automobile two clamps, in accordance with my invention are employed.

Referring now to the drawings in detail, the numeral 1 deisgnates the rear or drive wheel of an automobile which, of course, carries the usual tire 2. In the showing of Figures 1 and 2 the wheel 1 is of the disc type, but it will be obvious as the description progresses that my improvement may be applied to a wheel of this type or to a wheel of the spoked type.

The improvement comprises essentially a comparatively wide arched spring member 3. The ends of the member, constituting the clamp 3, are designed to spring toward each other, and the clamp, of course, is of a size to snugly fit over the tire 2. The sides of the clamp 3, adjacent to the ends thereof, have central openings 4 therethrough and through these openings there is passed the shank of a cotter pin. The eye of the cotter pin is indicated by the numeral 5 and the arms 6 thereof are bent laterally in opposite directions over the inner face of the said sides of the clamp. The ends of the arms 6 are rounded upon themselves over the edges of the clamp and the extremities of the said rounded portions are brought to tightly engage with the outer face of the sides of the clamp as indicated by the numeral 7 in the drawings. To each of the eyes 5 there is attached a short chain 8 and each of the chains has its outer end provided with a hook 9. The clamps are arranged over the tire 2 at the rear portion thereof, as disclosed in Figure 1 of the drawings. The sides of the clamps will exert a pressure against the sides of the tire and the arms 6 of the eye member 5 are also brought into tight gripping engagement with the said sides of the tire.

The arms 6 of the cotter pins are thus to be considered in the nature of gripping elements which not only tightly engage with the side walls of the tire when a pull is exerted on the short chains 8, but likewise serve as fulcrum elements for more tightly forcing the ends of the clamp into biting engagement with the sides of the tire and likewise force the central portion of the clamp into tight frictional engagement with the tread surface of the tire. This is best illustrated in Figure 3 of the drawings. In this manner the clamp is effectively held from movement on the tire. The end links of the side members of an anti-skid chain are attached to the hooks 9. The automobile is driven in a forward direction a sufficient distance to bring the clamps to the position illustrated in Figure 2 of the drawings, which fully winds the anti-skid chain around the tire. The hooks 9 are removed from the end links of the anti-skid chain and the clamps are also removed from the tire. Thereafter the catch elements 11 carried by the end links of the anti-skid chain are brought to engage with the opposite end links of the said chain. With my improvement the anti-skid chains may be easily and quickly arranged around a tire. The improvement is cheaply constructed and is of a comparatively small size so that the same may be readily stored in the machine when not required for use.

By reversing the position of the clamp 3, that is by arranging the same around the felly of a spoked automobile wheel, the anti-skid chain may be arranged around the said wheel in a manner as previously disclosed. To more effectively prevent any tendency of movement of the clamp on this type of wheels I have illustrated in Figure 5 of the drawings a modification which may be employed. The clamp 3', in the said Figure 5, is substantially similar to that previously described except that the same at the center thereof, has one of its edges notched, as at 12. This notch receives therein one of the spokes of the vehicle wheel. The free ends of the said clamp may be slightly rounded toward each.

Having described the invention, I claim:—

1. Means for facilitating the application of an anti-skid chain on the tire of the drive wheel of an automobile, comprising an arched spring clamp, the ends of which exert a tension toward each other, said clamp designed to be arranged over a tire of a wheel for gripping engagement with the sides of the tire, permanently fixed lateral projections providing tire gripping elements on the inner sides, adjacent to the ends of the clamp, said projections being of a length at least equalling that of the width of the clamp and means on the outer sides of the spring clamp arranged centrally and directly opposite the lateral projections for attaching the end links of the side members of an anti-skid chain to the clamp.

2. Means for facilitating the application of an anti-skid chain on the tire of an automobile, comprising an arched spring clamp, designed to have its ends exert a tension toward each other and also designed to be arranged for gripping engagement with the sides of a tire, cotter pins passing through the sides of the clamp adjacent to the ends thereof, the arms of said pins being bent laterally over the inner face of the clamp and having their ends bent around the edges and over the outer face of the clamp, the arms of the said cotter pins providing tire gripping as well as fulcrum members, short hook carrying chains suspended from the eyes of the cotter pins, the hooks of the said short chains designed for engagement with the end links of the side members of an anti-skid chain, for the purpose set forth.

In testimony whereof I affix my signature.

CHARLES EDWARDS.